United States Patent
Asplund et al.

(10) Patent No.: US 8,009,622 B2
(45) Date of Patent: Aug. 30, 2011

(54) METHOD AND APPARATUS FOR IMPROVED SINGLE CELL ADAPTION DUE TO CHANGE IN ENVIRONMENT

(75) Inventors: Henrik Asplund, Stockholm (SE); Mathias Riback, Danderyd (SE); Bo Goransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/300,017

(22) PCT Filed: May 9, 2006

(86) PCT No.: PCT/SE2006/050114
§ 371 (c)(1),
(2), (4) Date: Nov. 10, 2009

(87) PCT Pub. No.: WO2007/129944
PCT Pub. Date: Nov. 15, 2007

(65) Prior Publication Data
US 2010/0046382 A1     Feb. 25, 2010

(51) Int. Cl.
*H04W 4/00* (2009.01)
*H04B 1/02* (2006.01)

(52) U.S. Cl. .................................. 370/329; 455/101
(58) Field of Classification Search .................. None
See application file for complete search history.

(56) References Cited

U.S. PATENT DOCUMENTS

| | | | |
|---|---|---|---|
| 6,373,433 B1 * | 4/2002 | Espax et al. | 342/368 |
| 6,754,473 B1 * | 6/2004 | Choi et al. | 455/101 |
| 2006/0181456 A1 * | 8/2006 | Dai | 342/377 |
| 2007/0002963 A1 * | 1/2007 | Pedersen et al. | 375/267 |
| 2007/0183362 A1 * | 8/2007 | Mondal et al. | 370/329 |
| 2007/0286124 A1 * | 12/2007 | Grant et al. | 370/331 |
| 2008/0305805 A1 * | 12/2008 | Mondal et al. | 455/446 |
| 2009/0239486 A1 * | 9/2009 | Sugar et al. | 455/101 |

* cited by examiner

*Primary Examiner* — Ricky Ngo
*Assistant Examiner* — Clemence Han

(57) ABSTRACT

A communication method for use in a wireless communications network is proposed, said method comprising the steps of—monitoring at least one property representative of the channel variability in time and/or frequency, for each of at least two channels in the cell, used to communicate with said at least two user terminals; —using the result of the monitoring to control, by a control node in the network or in one of the user terminals, the communication in the cell. The control of the communication may include artificially inducing time selectivity and/or frequency selectivity or selecting an operating mode for the cell.

27 Claims, 2 Drawing Sheets

METHOD AND APPARATUS FOR IMPROVED SINGLE CELL ADAPTION DUE TO CHANGE IN ENVIRONMENT

TECHNICAL FIELD

The present invention relates to a method and an apparatus for transmitting in a cellular communications network and in particular to the control of communication in such a network.

BACKGROUND AND PRIOR ART

In a typical cellular communications system there are many system parameters that should be adapted to the actual situation, and to each other, in order to make the system work as efficiently as possible. For example, certain physical layer parameters may be adapted, such as frame structure, pilot distribution and multiple antenna transmission mode (beamforming, MIMO, space-time coding and others).

In a future system it may also be possible to select among different radio interfaces in a base station depending on the deployment scenario. For example, in micro or pico cells WLAN may be used and in large macro cells WCDMA or GSM/EDGE may be used.

When adapting the system parameters the operator will try to match these to situations that may occur in a certain cell. Different types of planning tools exist where certain parameters such as, for example, radio propagation models, are selected to match the anticipated environment, for example, in terms of an assumed worst case scenario or in terms of typical conditions in this environment. The actual communication in the cell may be very different from the initial assumptions made when deploying the system. Also, if a cell that has been designed for a particular environment and that environment is changed, e.g. new buildings, roads or other objects appear in the surroundings, the parameters may be changed to reflect the new situation. Either the communication in the cell will not work very well, or the communication will be unnecessarily complex. Variations in user behaviour over time can also cause the experienced channel conditions to deviate further from initial assumptions, for example, during busy hour.

Multipath propagation of radio waves in a wireless communication system results in a pattern of standing waves where minima are encountered when the vector sum of all waves is zero or close to zero. A mobile unit moving through this standing wave pattern will experience rapid signal variations, fading, that present a challenge to upholding and optimizing the transmission and reception of information. The multipath fading can be experienced in both the time domain and in the frequency domain. Multipath fading can be time-selective or frequency-selective.

Time-Selective Multipath Fading:

Movement of the receiving antenna through the standing wave pattern will result in signal variations in time. By reciprocity, the same variations will be observed if the direction of transmission is reversed, i.e. the moving receiver becomes a moving transmitter and the stationary transmitter becomes a stationary receiver. Furthermore, even if both transmitter and receiver are stationary, movement and changes in the surroundings of the two may result in changes to the standing wave pattern and hence time variations of the received signal. All types of movement give rise to what is referred to as time-selective multipath fading, or time selectivity.

Frequency-Selective Multipath Fading:

The phase of each radio wave is a function of the path length expressed in wavelengths. If the frequency is shifted, the phase of each radio wave may also be shifted, and the standing wave pattern is changed. Thus, at a given time instant, the received signal will have fading variations over the frequency band that is referred to as frequency-selective multipath fading or frequency selectivity.

In addition, multiple antennas may be used for transmission and/or reception of the radio waves. Properties of the antenna arrangement such as relative positions, radiation patterns, mutual coupling and polarization will result in different weighting and phase shifts of the radio waves at different antennas. Hence, the standing wave pattern associated with one transmitting antenna may be partially or fully independent of that associated with another transmitting antenna. By reciprocity, the same hold for different receiving antennas. Thus, different signal strengths may be encountered for different antennas, which will be referred to as antenna selectivity.

The time and frequency selectivity of the wireless communication channel presents a challenge to upholding efficient communication. Various methods have been devised to utilize the selectivity and improve the system performance; examples of such methods are coding, diversity, scheduling and Automatic Retransmission Request (ARQ) or hybrid ARQ.

Coding and diversity add redundancy to avoid the loss of information caused by fading dips, while scheduling utilizes channel knowledge to distribute the information over time and frequency to avoid times or frequencies in which the channel conditions are poor in terms of poor signal strength or high interference.

All of these methods will improve information transfer under certain channel conditions that are typical for the operation of wireless systems. However, all of the described methods also have limitations depending on the time and frequency selectivity of the channel. When the channel variations with time or frequency are slow compared to the extent of the transmitted data block the methods cannot provide resilience towards channel variations or C/I variations. On the other hand, when the channel variations are very fast a large amount of overhead information is needed for the receiver to be able to estimate the channel, leaving less room for the transfer of information. Frequency selectivity also introduces inter-symbol interference (ISI), which may lead to a need for channel equalization. This will require more complex and costly receivers.

A well known method for creating additional selectivity in wireless systems is to use more than one antenna at either transmitter or receiver or both. This creates multiple channels that may be more or less decorrelated, allowing the use of redundancy or scheduling over the antenna domain. The drawback of this solution is added complexity and cost, and often the need for more overhead signalling.

Adding time or frequency selectivity to the wireless channel using multi-antenna transmission of a cellular communications network is known per se. For example, in TDMA systems, delay diversity can be applied uniformly in a cell. In this case, two or more antennas are used to transmit delayed replicas of the same signal. At the receiving antenna, the delayed replicas will be superimposed and give rise to an increased time dispersion compared to the single antenna case. In this way increased frequency selectivity is achieved. If the frequency selectivity is increased too much increased inter-symbol interference and system degradation will result.

Two or more antennas may also transmit the same signal with different time varying amplitudes and/or phases, to achieve time selectivity. This technique, in combination with channel dependent or quality dependent scheduling, has been termed opportunistic beamforming. The additional time selectivity introduced in this way is beneficial in slowly varying channels but can cause problems if the channel is already varying rapidly.

A combination of time and frequency selectivity has also been described, where different time variations are introduced in different segments of the frequency band.

When the channel does not provide sufficient time and frequency selectivity the use of an artificially created time and frequency selectivity can lead to large improvements in system capacity and throughput. On the other hand, if the channel for a certain user already provides sufficient selectivity, there is no additional gain from artificially creating more selectivity in the time or frequency domain. It may even be harmful if the selectivity exceeds that required for the system to operate in an optimal way. In this case time and frequency variations may be so rapid that they cause degradation due to, for example, inter-symbol interference or channel estimation errors. Given a certain system configuration there exists a region of selectivity in which the system performance is improved compared to outside this region. Prior art solutions only enable this region to be moved, but not extended.

Also, in a multi-user system each user experiences individual channel conditions. For some users the performance would benefit from artificial selectivity while others might be harmed by it. Selecting the appropriate amount of artificial selectivity becomes a difficult design choice that may have undesired consequences if the experienced channel conditions differ from the expected. A related design choice is the selection of the maximum time dispersion and mobile speed at which a certain system performance should be required. The artificially induced time and frequency variations must be taken into account, which effectively lowers the maximum possible rate of channel variations.

Yet another problem with the existing solutions is that both instantaneous and average channel characteristics will differ between the uplink and the downlink, as the artificial selectivity is only induced in one of the links. Therefore, methods that rely on the similarity of the characteristics between uplink and downlink will suffer from degraded performance. For example, in a time-division duplex (TDD) multiplex system the channel is usually assumed to be identical in both directions. This will not be the case if artificial selectivity is introduced in one of the links. Another example could be where a transmitting unit can choose from two possible coding/interleaving schemes, one best suited for rapid time variations of the channel and the other best suited for slow channel variations.

Communication systems can be designed to be flexible in how the transmitted information is spread over time and frequency, both to be able to adapt to the coherence time and frequency of the channel and to adapt to the different requirements of different users. Artificially inducing a fixed amount of selectivity may limit the benefit of this flexibility, for example, if one user requires a large part of the available frequency band. Too much frequency selectivity could lead to this user being scheduled on many small non-contiguous frequency segments, whereas with less frequency selectivity the user could have been scheduled on one contiguous segment. The latter situation would require less signalling overhead.

OBJECT OF THE INVENTION

It is an object of the invention to improve the ability of a cellular communication system to provide efficient communication under a variety of channel conditions.

SUMMARY OF THE INVENTION

This object is achieved according to the present invention by a communication method for use in a wireless communications network comprising at least one cell in which a base station is arranged to communicate with at least two user terminals through a wireless interface, said method comprising the steps of monitoring at least one property representative of the channel variability in time and/or frequency, for each of at least two channels in the cell, used to communicate with said at least two user terminals;

using the result of the monitoring to control, by a control node in the network, the communication in the cell.

The object is also achieved by a control unit for transmitting in a wireless telecommunications network, characterized in that it comprises means for obtaining information about at least one property representative of the channel variability in time and/or frequency, for each of at least two channels in the cell, used to communicate with said at least two user terminals;

control means for controlling the communication in the cell using the result of the monitoring.

According to the invention the system environment may be measured, and system parameters may be set according to the measurement results. In this way system parameter values can be optimized. Thus, the system operator can adapt system parameter values in dependence of where, for example, a base station is placed. The location of the base station can then be selected more freely than is possible with the prior art. Alternatively, the system parameters may be set according to desired conditions. For example, coverage may be prioritized over high data rates so that diversity is important (or vice versa). Such measurements may be carried out by the operator before system deployment or while the system is in operation. Alternatively, the system itself may comprise functions for making these measurements and possibly also for adjusting system parameters in dependence of the measurement results.

The adaptation, or choice, of system parameters, or the choice of access technique, will be dependent on a number of parameters. According to the invention, these parameters are measured and the adaptation of the system is made dependent on the actual parameter values, that is, to the current situation in the cell. In this way, the use of system resources can be optimized. All parameters that are dependent on the environment may be used for the adaptation, including guard periods, such as cyclic prefix or the distance between two time slots, how often measurements are reported, the access method, encoding method, interleaving depth, and others. It may also be possible to select the access method in dependence of typical time dispersion or Doppler shift in the cell.

Hence, according to the invention parameters may be set in dependence of the current environment at any given time instead of, as in the prior art, trying to adapt an access method so that it will work satisfactorily in all possible environments.

The adaptation may be made by an operator based on reports from the control node. Alternatively, the adaptation may be made automatically by software found in the control node.

In a preferred embodiment the at least one property is monitored by the at least two user terminals and the result is communicated from each user terminal to the control node. Alternatively or in addition to this at least one property may be monitored by a node in the network.

In a preferred embodiment the control of the communication preferably includes selecting an operating mode for the cell in dependence of the monitoring result. In this embodiment, the channel properties and/or system parameters in the cell can be changed in such a way as to optimize each radio link according to some criterion.

An operating mode may be defined as a set of parameters that will result in certain properties of the system. Changing the operating mode, by changing one or more parameters, will change the properties of the system. For example, the system can be in a low Doppler mode or a high Doppler mode depending, for example, on the speed of a typical mobile terminal in the system. Operating modes may include, for example:

large or small cell
high or low Doppler
high or low frequency selectivity

For each operating mode different parameters will have optimal values.

Preferably a number of discrete states defining specific values of the system parameters, and possibly combinations of values for different system parameters are specified, so that a manageable number of system states is achieved. In this way, an operator can choose the predefined system state that fits the present conditions in a cell without having to adjust each system parameter individually.

According to the invention a more flexible system is achieved. Also, the system can be optimized towards different scenarios without increasing the overhead too much.

The transmitting unit, which may be the base station or the user terminal, may obtain knowledge about the channel conditions in several different ways. The received channel may be measured and the information obtained may be used to control the transmission in the opposite direction. Thus, the mobile terminal will measure on the downlink channel received from the base station and use this information to adapt the uplink channel, and vice versa. Alternatively, or in addition to this, a unit may report quality information about received channels to the sender, which the sender can use to adapt the system parameters.

The unit (base station or user terminal) that adjusts the communication characteristics will preferably inform the receiver (user terminal or base station, respectively) of the adjustments made. This is particularly important if other control mechanisms in the network are based on the assumption that the uplink and downlink channels have the same properties. If one link is changed this assumption will be wrong and the other control mechanisms may not work properly.

The information about the adjustments made may be extended to concern planned changes as well. For example the information may comprise that the adjustments will start instantly, or a certain number of frames later. Each time the adjustments are activated, deactivated or changed, new information should be sent.

In a preferred embodiment the time and/or frequency selectivity may be induced in the system individually for each user terminal in dependence of the conditions experienced by the respective terminal. Preferably, information about the artificially induced selectivity is communicated from the base station to the user terminal.

The criteria to optimize to include, but are not limited to, the following:

Guard period, such as cyclic prefix length in OFDM systems
equalizer length (in GSM systems)
searcher window/rake complexity (in CDMA systems
pilot density in time and frequency
number of users and scheduling requirements
slot length individual user conditions or, alternatively, average or worst case conditions Thus, for example, for a user terminal that is not moving, time variations can be added, without the need to change the conditions for any other user terminal.

As will be shown below, the combination of artificially introduced time and frequency selectivity an be expressed as $$Y(f, t) = X(f, t) \cdot \sum_{n=1}^{N} W_n(f, t) H_n(f, t),$$

Where
$Y(f,t)$ is the received signal,
$X(f,t)$ is the transmitted signal
$H_n(f,t)$ is the time and frequency variant channel, and
$W_n(f,t)$ is the weight function which is time and frequency variant The basic idea of the invention is that the transmitter should optimize the amount of selectivity in the effective channel by choosing the appropriate antenna weight functions $W_n(f,t)$. This requires knowledge of some of the properties of the radio channels $H_n(f,t)$. This knowledge could be obtained in two different ways:

1. by feedback of information describing the time and frequency selectivity of the channel from the receiver, or
2. by estimation of parameters describing the time and frequency selectivity of the channel from information transmitted on the duplex link.

The optimization step comprises selecting antenna weight functions $W_n(f,t)$ or sealing parameters for previously selected weight functions. The selection of antenna weight functions in a given situation may depend on some or all of the following parameters:

cyclic prefix length (in OFDM systems)
equalizer length (in GSM systems)
searcher window/rake complexity (in CDMA systems
the density of transmitted pilot information in time and frequency
number of receivers to transmit to
the methods for diversity and redundancy, or for scheduling
fundamental structures in time and frequency (symbol lengths, slot lengths, minimum resource block sizes)

If Doppler diversity or delay diversity is used the time and frequency variations that are introduced will be periodic in time for stationary channels and periodic in frequency for frequency flat channels. This periodicity can be used in several ways:

1. Channel estimation can be improved if the period is known. The channel conditions at future time instants or at other frequencies can be extrapolated from the current state. The amount of channel quality feedback may also be reduced.
2. Pilots may be allocated more efficiently.

Preferably, the receiver is informed about the amount of introduced artificial selectivity. This may be accomplished by a dedicated signalling method, such as:

representing a finite set of possible artificial selectivity schemes with finite bit sequences (code words)
on/off signalling (one bit). This is appropriate even for the non-adaptive artificial selectivity. This is a special case of the above
communicating parameters describing the artificial channels, that is, $W_n(f,t)$.

It could also be achieved indirectly, for example through a time-slotted or frequency slotted application of the artificial diversity. This would mean that for some predefined time slots, or frequencies, there would be no artificial selectivity. The receiver may use this to learn about the amount of artificial selectivity by comparing the channel conditions for different time slots, or frequencies.

The signalling may be common or dedicated depending on whether the artificially created selectivity is common to all receiving units or individually adapted to each receiver.

The artificially induced periodic time and/or frequency variations may be used in conjunction with a scheduler that is aware of the period lengths so that the channel conditions can be extrapolated to future time instants or other frequencies.

The artificially induced selectivity may be combined with, for example, transmit diversity, beam forming or MIMO. In other words, M pilots may be transmitted from N antennas (N>M), and the remaining N-M antennas may be used for artificially creating selectivity by transmitting weighted replicas of the information transmitted on some or all of the N antennas.

BRIEF DESCRIPTION OF THE DRAWINGS

The invention will be described in more detail in the following, by way of example and with reference to the appended drawings in which.

DETAILED DESCRIPTION OF EMBODIMENTS

Figure 1:
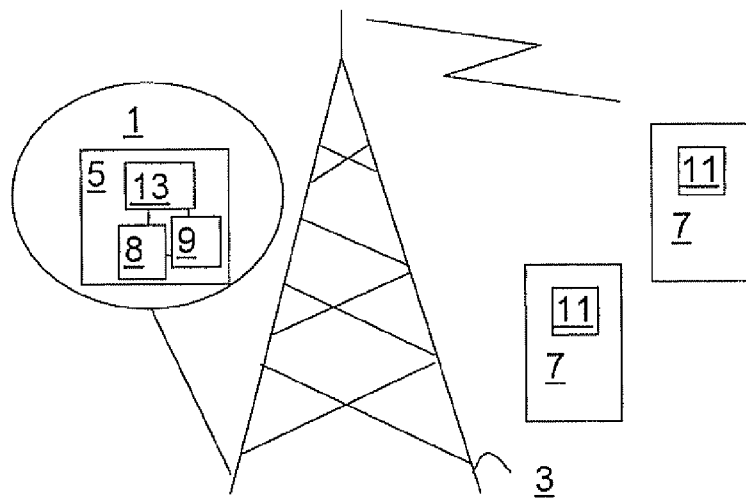
FIG. 1 illustrates a mobile telecommunications network in which the principles of the invention may be applied.

FIG. 1 shows a cellular telecommunications network 1 in which the principles of the present invention may be applied. A base station 3 is associated with, or comprises a control unit 5. The base station 3 communicates with one or more user terminals 7 in the cell through a wireless interface. The communication is affected by the layout and size of the cell, whether or not the terminals 7 are moving, and how fast, any reflecting objects that may be present in the cell, and possibly other factors. The skilled person is familiar with the factors affecting the communication in a cellular network.

The communication between the base station and the user terminals is bidirectional. Thus, both the base station 3 and the user terminals 7 comprise transmitters, receivers and control means for controlling the communication The control unit comprises a control means 8 for performing the control functions. Also, both the control unit 5 and the user terminals 7 preferably comprise monitoring means 9, 11, respectively, for monitoring one or more parameters representative of the channel quality. These parameters are reported to the control means 8 so that they can be used to control the communication in the cell and are preferably stored in a database 13. Alternatively, of course the monitoring means 9 in the network may be implemented as a separate unit communicating with the control unit 5.

Figure 2:
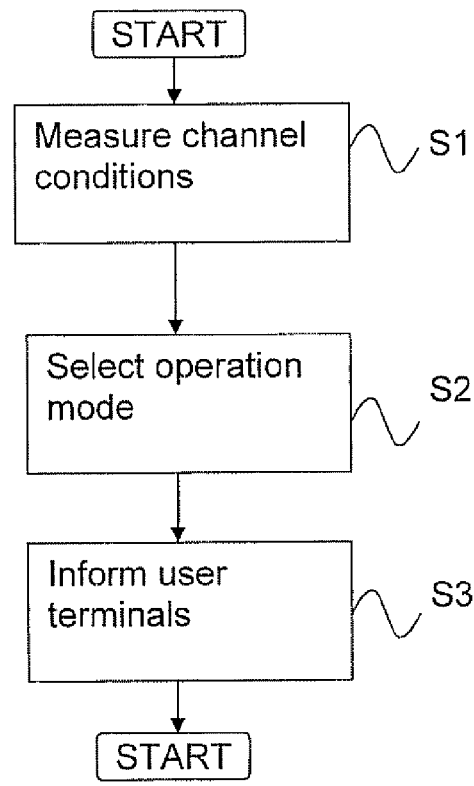
FIG. 2 is a flow chart of a first aspect of the invention.
Figure 3:
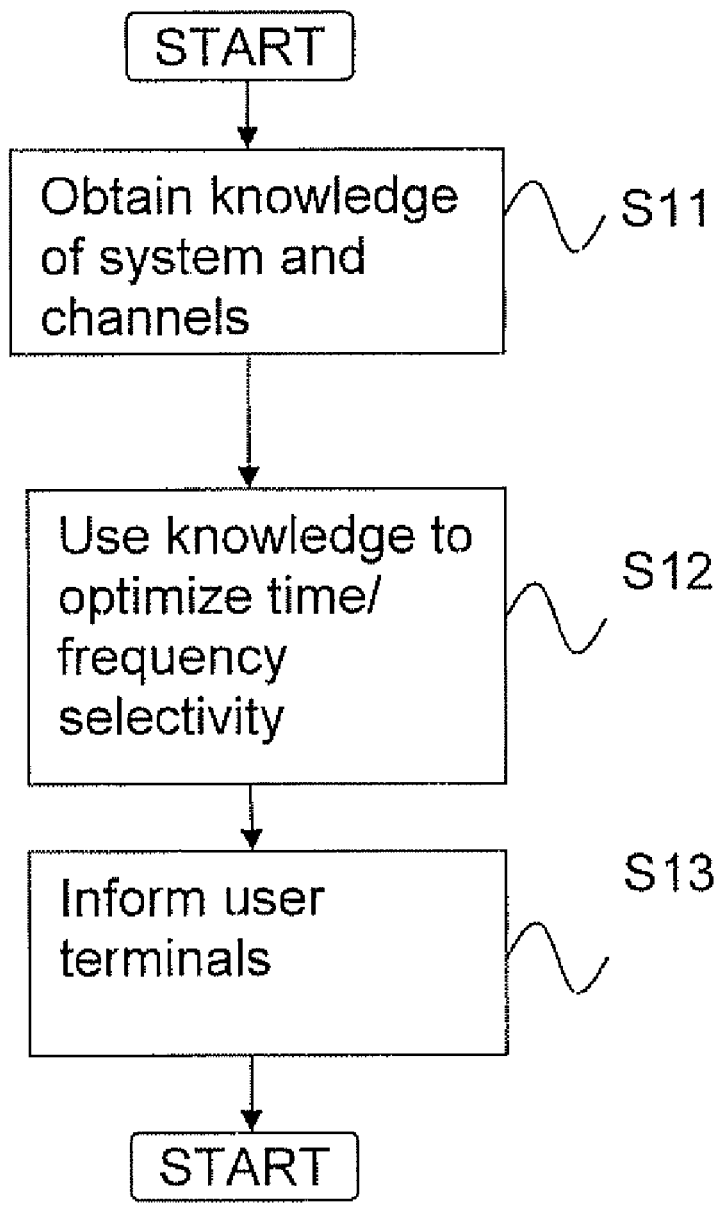
FIG. 3 is a flow chart of a second aspect of the invention.

According to a first main embodiment of the invention the channel quality parameters obtained are used to select the system parameters to be used in the whole cell. This is discussed below with reference to FIG. 2:

Step S1: Measure channel conditions in the cell. This may be done by the base station 3, the monitoring means 9 and/or other nodes in the network. It may also be done by the monitoring means 11 of the user terminals 7, which, in this case, report the measurement results to the control node 5 in the network.

Step S2: Select operation mode or access technique depending on the measurements. This is done by the control node 5. Alternatively, it may be done manually by an operator based on reports generated by the control node 5.

Step S3: Inform the user terminals of the cell about the system parameters selected for the cell, for example the pilot density selected. This information is preferably included in a synchronization channel or similar, since it may be needed to enable the channel to retrieve information from the other channels.

The measurements performed in step S1 may also be performed before the system is deployed, by means of other measuring apparatus.

Alternatively, the monitoring means 11 of the user terminals 7 may function as control units and select certain operation mode parameters for the uplink. In this case, in step S3 the user terminal may inform the control node 5 in the base station of the system parameter selected by the user terminal 7.

As mentioned above, the measurement results from step S1 may be stored in a database 13 in the system. Periodically, the system can retrieve statistics from the data base to use for adapting system parameters. For example, the system can find the minimum and maximum values of some parameters over time and then adapt system parameters accordingly. This can also be used in combination with location parameters. In this case, before system deployment the operator measures relevant parameters in the area and these parameters are stored in a database together with location parameters. At system deployment the database can be used to set the parameters individually in each cell using the location parameter data.

Further, if the parameters, including the localization parameters are updated while the system is operating this database can be used to set parameters for each user at link setup. In this way, when a new user enters the system its location is estimated and this value is used to look up the parameter setting that should be used for this particular terminal. Parameters describing time and/or frequency selectivity, such as delay spread and angle spread, may be stored.

In step S2 the system parameters may be set independently of each other. Alternatively, discrete states defined by sets of system parameter values may be defined, in which case the setting of parameters involves selecting a suitable set depending on the current conditions of the cell.

Step S3 is optional but is preferably performed to enable the user terminal to communicate in an optimal way.

For example, in order to support efficient operation in scenarios with very different delay spread, an OFDM system may have different cyclic prefixes tuned to different scenarios. In order to choose the preferred mode of operation the base station might measure the time dispersion and then select the appropriate length of the cyclic prefix. Also, according to the invention a network operator can tune network parameters adaptively according to the propagation environment.

According to the first main embodiment the system parameters may be set in such a way as to optimize the communication without making the system unnecessarily complex. For example, time dependent scheduling will not be meaningful if there is no variation with time. Similarly, if there is no or little frequency dependence, frequency selectivity will only make the system more complex without adding to the quality. If a cell is substantially stationary, pilot signals may be sent more seldom, and the frames may be longer, than if there are fast variations in the cell. For example, an indoor cell will vary less than an outdoor cell.

Some parameters, such as pilot density, may have different values for different user terminals within the same cell. Other parameters will always have the same value throughout the cell.

According to a second main embodiment of the present invention the channel quality parameters obtained are used to adapt the time and/or frequency selectivity individually to each user terminal.

The techniques for artificially creating time or frequency selectivity are already well known, but will be summarized in the following, in order to describe the advantages of the new invention.

Time selectivity is induced by transmitting replicas of the same time- and frequency variant signal X(f,t) over different antennas, the replica on each antenna being multiplied by a time-varying complex weight $w_n(t)$. The transmitted signals from antenna n will experience the time- and frequency variant channel $H_n(f,t)$, and finally all transmitted signals will superimpose at the receive antenna resulting in a received signal Y(f,t) according to:

$$Y(f, t) = X(f, t) \cdot \sum_{n=1}^{N} w_n(t) H_n(f, t) \quad (1)$$

Usually the time-varying weights $w_n(t)$ are chosen such that $$\sum_{n=1}^{N} |w_n(t)|^2 = P(t) \quad (2)$$

where P(t) is the power that would normally have been transmitted on one antenna. Even when $H_n(f,t)$ is static or quasi-static over time the time-varying weights will introduce time variations in the received signal Y(f,t), as long as the different $H_n(f,t)$ are sufficiently uncorrelated. A simple form of artificial time selectivity, "Doppler diversity", is when each antenna transmits with a certain carrier frequency offset $\Delta f_n$:

$$Y(f, t) = X(f, t) \cdot \sum_{n=1}^{N} H_n(f, t) \cdot e^{j2\pi \Delta f_n t} \quad (3)$$

Frequency selectivity can be introduced in two different ways, the simplest being to use delay diversity. Here the received signal can be expressed as a convolution of the transmitted signal with an effective channel impulse response:

$$y(\tau, t) = x(\tau, t) * \sum_{n=1}^{N} h_n(\tau - \Delta t_n) \quad (4)$$

where $\Delta t_n$ is the delay of the copy of the signal that is transmitted from antenna n. In the frequency domain:

$$Y(f, t) = X(f, t) \cdot \sum_{n=1}^{N} H_n(f, t) \cdot e^{j2\pi f \Delta t_n} \quad (5)$$

Even when $H_n(f,t)$ is frequency flat the effective channel will be frequency selective as long as the $\Delta t_n$ are different for different n.

The second method of introducing frequency selectivity is to multiply the transmitted signal directly by frequency-variant weights $W_n(f)$ for each transmit antenna:

$$Y(f, t) = X(f, t) \cdot \sum_{n=1}^{N} H_n(f, t) \cdot W_n(f) \quad (6)$$

This method is particularly well suited to systems that use signal processing in the frequency domain (as in e.g. an OFDM system) but could also be implemented in the time domain through convolving the transmitted signals with the impulse response representations of $W_n(f)$.

The combination of artificially introduced time and frequency selectivity can be described as:

$$Y(f, t) = X(f, t) \cdot \sum_{n=1}^{N} W_n(f, t) H_n(f, t) \quad (10)$$

Time and frequency selectivity can be obtained even for channels which are stationary and frequency flat, given the right choices of $W_n(f,t)$.

For these different methods one can determine the effective channel, which is summarized for the various methods in Table 1. Note that Doppler, delay and Doppler-delay diversity are special cases of the more general forms of artificial selectivity.

TABLE 1

Effective channel for different kinds of selectivity

| Method | Effective channel |
| --- | --- |
| "Doppler diversity" | $H_{\it{eff}}(f, t) = \sum_{n=1}^{N} H_n(f, t) \cdot e^{j2\pi \Delta f_n t}$ |
| Artificial time selectivity | $H_{\it{eff}}(f, t) = \sum_{n=1}^{N} H_n(f, t) \cdot w_n(t)$ |
| Delay diversity | $H_{\it{eff}}(f, t) = \sum_{n=1}^{N} H_n(f, t) \cdot e^{j2\pi f \Delta t_n}$ |
| Artificial frequency selectivity | $H_{\it{eff}}(f, t) = \sum_{n=1}^{N} H_n(f, t) \cdot W_n(f)$ |
| "Doppler-delay" diversity | $H_{\it{eff}}(f, t) = \sum_{n=1}^{N} H_n(f, t) \cdot e^{j2\pi(\Delta f_n t + f \Delta t_n)}$ |
| Artificial time and frequency selectivity | $H_{\it{eff}}(f, t) = \sum_{n=1}^{N} H_n(f, t) \cdot W_n(f, t)$ |

The basic idea is that the transmitter should optimize the amount of selectivity in the effective channel by choosing the appropriate antenna weight functions $W_n(f,t)$. This requires knowledge of some of the properties of the radio channels $H_n(f,t)$ which could be obtained in two different ways:
1. By feedback of information describing the time and frequency selectivity of the channel from the receiver.
2. By estimation of parameters describing the time and frequency selectivity of the channel from information transmitted on the duplex link.

The optimization step amounts to selecting antenna weight functions $W_n(f,t)$ or scaling parameters for previously selected weight functions (such as $\Delta f_n$ and $\Delta t_n$ in the case of delay and Doppler diversity, or amplitude coefficients). The criteria for deciding which antenna weight functions are optimum in a given situation may depend on some or all of the following parameters:

Cyclic prefix length (OFDM), equalizer length (GSM), searcher window and rake complexity (WCDMA)
   The density of transmitted pilot information in time and frequency
   The number of receivers to transmit to
   The methods for diversity and redundancy, or for scheduling
   Fundamental structures in time and frequency (symbol lengths, slot lengths, resource block sizes)

When the transmitter simultaneously needs to transmit information to more than one receiver one can consider two possible scenarios:
1. Selectivity is artificially introduced using the same antenna weight functions for all links.
2. The antenna weight functions are individually adapted for each link.

The second scheme provides more degrees of freedom, but might result in more signalling if all receivers are to be informed of their respective antenna weight functions.

One interesting aspect of the Doppler diversity and the delay diversity schemes is that the time and frequency variations that are introduced will be periodic in time for stationary channels and periodic in frequency for frequency flat channels (periodic variations can also be introduced by other choices of $W_n(f,t)$). The periodicity can be utilized in several ways:
1. Channel estimation can be improved if the period is known. The channel conditions at future time instants or at other frequencies can be extrapolated from the current state. The amount of channel quality feedback may also be reduced.
2. Pilots may be allocated more efficiently given that the channel conditions will repeat themselves over time and frequency. Less pilot overhead is needed compared to the non-periodic case.

Artificial selectivity can be used without the receiver knowing anything about it, as the channel variations are indistinguishable from those of a more time or frequency selective channel without artificially introduced selectivity. However, in some cases, informing the receiver about the amount of introduced artificial selectivity may be beneficial. This could be accomplished by a dedicated signalling method or by more indirect means. Some examples are:
1. On/off signalling (one bit). This is appropriate even for the non-adaptive artificial selectivity.
2. Representing a finite set of possible artificial selectivity schemes with finite bit sequences (code words). Case 1 is a special case of this.
3. Communicating parameters describing the artificial channels, i.e. $W_n(f,t)$.

An indirect method could be a time-slotted or frequency-slotted application of the artificial diversity, i.e. for some pre-defined time slots or frequencies there is no artificial selectivity. The receiver may then learn about the amount of artificial selectivity by comparing the channel conditions in different time slots or frequencies.

Depending on if the artificially created selectivity is common for all receiving units or particular for each receiver, the signalling also has to be common or dedicated.

The basic inventive idea of introducing artificial selectivity may be combined with multi-antenna transmission in an advantageous way. This is particularly applicable to the ideas to transmit diversity, beamforming and MIMO. A "selective antenna" is defined as an antenna with more than one antenna element and artificial variations (adaptive or fixed) applied to each antenna element. Regular techniques such as transmit diversity, beamforming and MIMO can then be applied to a set of "selective antennas". An example is transmit diversity with two pairs of antennas, where each pair appears as a single antenna to the receiver (the same pilot is transmitted from both antennas in the pair, but with the artificial selectivity imposed).

In summary, according to the second main embodiment of the invention the method comprises the following steps:
Step S11: Obtain knowledge of system behaviour and channel conditions. Such knowledge may be estimated by the control node from the duplex link or reported via feed-back from the receiver.
Step S12: Use the knowledge obtained in step S11 to optimize the time and/or frequency selectivity.
Step S13: Communicate information about the artificially generated time and/or frequency selectivity to the receivers. The receiver can use this information for channel estimation or when determining the appropriate method to use for transmitting.

In step S12 the criteria to optimize to include, but are not limited to, the following:
   guard time, such as cyclic prefix length (in OFDM systems)
   equalizer length (in GSM systems)
   searcher window/rake complexity (in CDMA systems
   pilot density in time and frequency
   number of users and scheduling requirements
   slot length
   individual user conditions or, alternatively, average or worst case conditions.

As discussed above in connection with FIG. 2, the optimization of time and frequency selectivity may be performed in the control unit 5 in the network or, for certain parameters, in a control unit in the user terminal 7, which may be the monitoring unit 11 with some added functionality or a separate unit. In the latter case, in step S13 the user terminal 7 informs the control unit 5 in the network of the artificially generated time and/or frequency selectivity.

While the two aspects of the invention described above may be used separately to improve the communication within a cell, they may also be combined. As an example, applying the first aspect of the invention, the system may first measure the signalling conditions of all user terminals in the cell. The highest Doppler shift of any user terminal in the cell may then be determined and system parameters may be set to optimize communication for this Doppler shift. According to the second aspect of the invention the Doppler shift for all other user terminals may be increased to optimize communication for each user terminal given the new system parameters.

As is known in the art, a Doppler shift may be introduced by using two antennas transmitting with slightly different frequencies.

Usually in many wireless communication systems the uplink and downlink of a channel have corresponding properties. In this case data obtained from the uplink can be used to adapt the downlink, and vice versa. According to the second main embodiment of the invention this may not be the case, since the properties of the uplink and the downlink may be changed independently of each other. Therefore, data regarding the adaptation of a channel must be communicated from the control unit to the mobile terminal communicating on that channel.

In some cases, for example when performing handover, it may be necessary or desirable for a mobile terminal to communicate with more than one base station at a time. In this case the channel adaptation should be performed for the communication with both (or all) base stations.

The invention claimed is:

1. A communication method for use in a wireless communications network comprising at least one cell in which a base station is arranged to communicate with at least one user terminal through a wireless interface, said method comprising:
monitoring at least one property representative of the channel variability in time and/or frequency, for at least one channel in the cell used to communicate with said at least one user terminal;
using the result of the monitoring to control, the communication in the cell; wherein the control of the communication in the cell includes artificially inducing time selectivity and/or frequency selectivity in the communication in said at least one channel in the cell by choosing one or more antenna weight functions for a plurality of transmit antennas;
transmitting one or more pilot signals over the transmit antennas for use by a receiver in estimating conditions of the at least one channel, wherein a number of unique pilot signals transmitted is less than a number of transmit antennas used; and
transmitting a common signal over said at least one channel using the transmit antennas, wherein the common signal is weighted in accordance with the chosen antenna weight functions.

2. The communication method according to claim 1, wherein said at least one property is monitored by the at least one user terminal and the result is communicated from the at least one user terminal to the control node.

3. The communication method according to claim 1 wherein said at least one property is monitored by a node in the network.

4. The communication method according to claim 3 wherein said monitored property is communicated from the network node to the at least one user terminal.

5. The communication method according to claim 1, wherein information about the artificially induced selectivity is communicated from the base station to the user terminal and/or from the user terminal to the base station.

6. The communication method according to claim 1, wherein the choice of the antenna weight functions requires knowledge of said at least one property for said at least one channel in the cell.

7. The communication method according to claim 6, wherein the at least one property could be obtained by either feedback of information describing the time and frequency selectivity of said at least one channel in the cell from the receiver, or by estimation of parameters describing the time and frequency selectivity of said at least one channel in the cell from information transmitted.

8. The communication method according to claim 7, wherein choosing one or more antenna weight functions for a plurality of transmit antennas comprises individually adapting the antenna weight functions for each of a plurality of channels used to transmit to a plurality of receivers.

9. The communication method according to claim 1, wherein choosing one or more antenna weight functions for a plurality of antennas comprises choosing the one or more antenna weight functions without receiving feedback for a separate transmission path associated with each of the plurality of antennas.

10. The communication method according to claim 9, wherein choosing the one or more antenna weight functions without receiving feedback for a separate transmission path associated with each of the plurality of antennas comprises choosing the one or more antenna weight functions based on feedback describing said at least one channel with respect to all transmission traversing said at least one channel.

11. The communication method according to claim 9, wherein choosing the one or more antenna weight functions without receiving feedback for separate transmission paths associated with each of the plurality of antennas comprises choosing the one or more antenna weight functions without receiving any feedback regarding said at least one channel from the receiver.

12. The communication method according to claim 1, wherein choosing one or more antenna weight functions for a plurality of antennas comprises selecting, for each of the antennas, a carrier frequency offset to use in transmitting the common signal.

13. The communication method according to claim 1, wherein choosing one or more antenna weight functions for a plurality of antennas comprises selecting, for each of the antennas, a delay to use in transmitting the common signal.

14. The communication method according to claim 1, wherein choosing one or more antenna weight functions for a plurality of antennas comprises selecting, for each of the antennas, a carrier frequency offset and a delay to use in transmitting the common signal.

15. The communication method according to claim 1, wherein:
monitoring at least one property representative of the channel variability comprises monitoring cyclic prefix length of symbols transmitted on the channel; and
choosing one or more antenna weight functions for the plurality of antennas comprises choosing one or more antenna weight functions based on the cyclic prefix length of symbols transmitted on the channel.

16. The communication method according to claim 1, wherein:
monitoring at least one property representative of the channel variability comprises monitoring an amount of time and frequency resources used to transmit pilot information on the channel; and
choosing one or more antenna weight functions for the plurality of antennas comprises choosing one or more antenna weight functions based on the amount of time and frequency resources used to transmit pilot information on the channel.

17. The communication method according to claim 1, wherein:
monitoring at least one property representative of the channel variability comprises monitoring a symbol length associated with the channel; and choosing one or more antenna weight functions for the plurality of antennas comprises choosing one or more antenna weight functions based on the symbol length.

18. A control unit for transmitting in a wireless telecommunications network comprising at least one cell in which a base station is arranged to communicate with at least one user terminal through a wireless interface comprising
- means for monitoring at least one property representative of the channel variability in time and/or frequency, for at least one channel in the cell used to communicate with said at least one user terminal;
- control means for controlling the communication in the cell using the result of the monitoring, wherein the control means is arranged to induce artificially time selectivity and/or frequency selectivity for the at least one channel by choosing one or more antenna weight functions for a plurality of transmit antennas;
- means for transmitting one or more pilot signals over the transmit antennas for use by a receiver in estimating conditions of the at least one channel, wherein a number of unique pilot signals transmitted is less than a number of transmit antennas used; and
- means for transmitting a common signal over said at least one channel using the transmit antennas, wherein the common signal is weighted in accordance with the chosen antenna weight functions.

19. The control unit according to claim 18, wherein the means for monitoring is arranged to monitor the at least one property and forward information relating to the at least one property to the control means.

20. The control unit according to claim 18, further comprising means for communicating information about the artificially induced time selectivity and/or frequency selectivity to another control unit through the at least one channel.

21. The control unit according to claim 18, further arranged to use the artificially induced periodic time and/or frequency variations in conjunction with a scheduler to extrapolate the channel conditions to future time instants or other frequencies.

22. The control unit according to claim 21, further arranged to combine the artificially induced periodic time and/or frequency variations with transmit diversity, beam forming or MIMO.

23. The control unit according to claim 18, further comprising a data base for storing information about said at least one property.

24. The control unit according to claim 18, wherein the control means is arranged to control the base station, and to receive information about said at least one property from at the least one user terminal.

25. The control unit according to claim 24, wherein the control means is arranged to select an operating mode for the cell in dependence of the result of the monitoring.

26. The control unit according to claim 25, wherein the control means is arranged to communicate information about the operating mode to the user terminal communicating through the at least one channel.

27. A wireless communication network comprising:
- a base station operable to communicate with at least one user terminal through a wireless interface, the base station comprising a control unit, the control unit comprising:
- means for monitoring at least one property representative of the channel variability in time and/or frequency, for at least one channel in the cell used to communicate with said at least one user terminal;
- control means for controlling the communication in the cell using the result of the monitoring, wherein the control means is arranged to induce artificially time selectivity and/or frequency selectivity for the at least one channel; and
- that the control means is further arranged to artificially induce time selectivity and/or frequency selectivity in said at least one channel in the cell by choosing one or more antenna weight functions for a plurality of transmit antennas;
- means for transmitting one or more pilot signals over the transmit antennas for use by a receiver in estimating conditions of the at least one channel, wherein a number of unique pilot signals transmitted is less than a number of transmit antennas used; and
- means for transmitting a common signal over said at least one channel using the transmit antennas, wherein the common signal is weighted in accordance with the chosen antenna weight functions.

* * * * *

UNITED STATES PATENT AND TRADEMARK OFFICE
CERTIFICATE OF CORRECTION

| | |
|---|---|
| PATENT NO. | : 8,009,622 B2 |
| APPLICATION NO. | : 12/300017 |
| DATED | : August 30, 2011 |
| INVENTOR(S) | : Asplund et al. |

Page 1 of 1

It is certified that error appears in the above-identified patent and that said Letters Patent is hereby corrected as shown below:

In Column 5, Line 64, delete "systems" and insert -- systems) --, therefor.

In Column 6, Line 7, delete "an" and insert -- can --, therefor.

In Column 6, Line 33, delete "sealing" and insert -- scaling --, therefor.

In Column 6, Line 39, delete "systems" and insert -- systems) --, therefor.

In Column 7, Line 50, delete "communication" and insert -- communication. --, therefor.

In Column 12, Line 43, delete "systems" and insert -- systems) --, therefor.

In Column 13, Line 29, in Claim 1, delete "control," and insert -- control --, therefor.

In Column 15, Line 7, in Claim 18, delete "comprising" and insert -- comprising: --, therefor.

Signed and Sealed this
Twenty-eighth Day of February, 2012

David J. Kappos
*Director of the United States Patent and Trademark Office*